(12) United States Patent
Dally et al.

(10) Patent No.: US 6,269,435 B1
(45) Date of Patent: Jul. 31, 2001

(54) SYSTEM AND METHOD FOR IMPLEMENTING CONDITIONAL VECTOR OPERATIONS IN WHICH AN INPUT VECTOR CONTAINING MULTIPLE OPERANDS TO BE USED IN CONDITIONAL OPERATIONS IS DIVIDED INTO TWO OR MORE OUTPUT VECTORS BASED ON A CONDITION VECTOR

(75) Inventors: William J. Dally, Stanford; Scott Whitney Rixner, Mountain View; John Owens, Menlo Park; Ujval J. Kapasi, Standford, all of CA (US)

(73) Assignees: The Board of Trustees of the Leland Stanford Junior University, Stanford, CA (US); The Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/152,944

(22) Filed: Sep. 14, 1998

(51) Int. Cl.[7] .................................................. G06F 9/305
(52) U.S. Cl. .................. 712/8; 712/5; 712/9; 712/22; 345/523; 345/524
(58) Field of Search ................................ 712/5, 9, 22, 8; 345/523, 524

(56) References Cited

U.S. PATENT DOCUMENTS

| | | | |
|---|---|---|---|
| 4,881,168 | * | 11/1989 | Inagami et al. ........................ 712/5 |
| 5,553,309 | * | 9/1996 | Asai et al. ............................ 710/34 |
| 5,604,913 | * | 2/1997 | Koyanagi et al. ...................... 712/5 |
| 5,678,058 | * | 10/1997 | Sato ...................................... 712/5 |
| 5,825,677 | * | 10/1998 | Agarwal et al. ..................... 708/520 |
| 5,907,842 | * | 5/1999 | Mennemeier et al. ................. 707/7 |
| 5,909,572 | * | 6/1999 | Thayer et al. ....................... 712/226 |
| 6,058,465 | * | 5/2000 | Nguyen .................................. 712/7 |

OTHER PUBLICATIONS

Cormen et al., "Introduction to Algorithms (MIT Electrical Engineering and Computer Science Series," *MIT Press*, ISBN 0262031418, pp. 665–667, 695–697.

* cited by examiner

Primary Examiner—Kenneth S. Kim
(74) Attorney, Agent, or Firm—Pillsbury Winthrop LLP

(57) ABSTRACT

A processor implements conditional vector operations in which an input vector containing multiple operands to be used in conditional operations is divided into two or more output vectors based on a condition vector. Each output vector can then be processed at full processor efficiency without cycles wasted due to branch latency. Data to be processed is divided into two groups based on whether or not they satisfy a given condition by, e.g., steering each to one of two index vectors. Once the data has been segregated in this way, subsequent processing can be performed without conditional operations, processor cycles wasted due to branch latency, incorrect speculation or execution of unnecessary instructions due to predication.

8 Claims, 6 Drawing Sheets

FIG. 4A — Load | Stream | Address Descriptor

FIG. 4B — Store | Stream | Address Descriptor

FIG. 4C — Send | Stream | Routing Header | Channel

FIG. 4D — Receive | Stream | Channel

FIG. 4E — Operate | Kernel | Stream Src1 | ... | Stream Src4 | Stream Dst1 | ... | Stream Dst4

SYSTEM AND METHOD FOR IMPLEMENTING CONDITIONAL VECTOR OPERATIONS IN WHICH AN INPUT VECTOR CONTAINING MULTIPLE OPERANDS TO BE USED IN CONDITIONAL OPERATIONS IS DIVIDED INTO TWO OR MORE OUTPUT VECTORS BASED ON A CONDITION VECTOR

"This invention was made in conjuction with U.S. Government support under U.S. Army Grant No. DABT63-96-C-0037."

BACKGROUND OF THE INVENTION

1. Field of the Invention

The present invention is directed to computer architectures. More specifically, the invention is directed to pipelined and parallel processing computer systems which are designed to efficiently perform conditional processing operations using a large number of operational units and pipelines.

2. Description of Related Art

Providing adequate instruction and data bandwidth is a key problem in modem computer systems. In a conventional scalar architecture, each arithmetic operation, e.g., an addition or multiplication, requires one word of instruction bandwidth to control the operation and three words of data bandwidth to provide the input data and to consume the result (two words for the operands and one word for the result). Thus, the raw bandwidth demand is four words per operation. Conventional architectures use a storage hierarchy consisting of register files and cache memories to provide much of this bandwidth; however, since arithmetic bandwidth scales with advances in technology, providing this instruction and data bandwidth at each level of the memory hierarchy, particularly the bottom, is a challenging problem.

Vector architectures have emerged as one approach to reducing the instruction bandwidth required for a computation. With conventional vector architectures, e.g., the Cray-1, a single instruction word specifies a sequence of arithmetic operations, one on each element of a vector of inputs. For example, a vector addition instruction VADD VA, VB, VC causes each element of an, e.g., sixty-four element vector VA to be added to the corresponding element of a vector VB with the result being placed in the corresponding element of vector VC. Thus, to the extent that the computation being performed can be expressed in terms of vector operations, a vector architecture reduces the required instruction bandwidth by a factor of the vector length (sixty-four in the case of the Cray-1).

While vector architectures may alleviate some of the instruction bandwidth requirements, data bandwidth demands remain undiminished. Each arithmetic operation still requires three words of data bandwidth from a global storage source shared by all arithmetic units. In most vector architectures, this global storage resource is the vector register file. As the number of arithmetic units is increased, this register file becomes a bottleneck that limits further improvements in machine performance.

To reduce the latency of arithmetic operations, some vector architectures perform "chaining" of arithmetic operations. For example, consider performing the above vector addition operation and then performing the vector multiplication operation VMUL VC VD VE using the result. With chaining, the vector multiply instruction consumes the elements computed by the vector add instruction in VC as they are produced and without waiting for the entire vector add instruction to complete. Chaining, however, also does not diminish the demand for data bandwidth—each arithmetic operation still requires three words of bandwidth from the vector register file.

Another latency problem arises in connection with conditional operations, i.e., operations in which the result is dependent on the result of a Boolean or multi-valued test on input data. For example, when sorting several values, two values are compared and, depending on whether the first is greater than, less than or equal to the second value, different actions may be taken.

As another example, consider chroma-keying a video signal. Chroma-keying is used to, e.g., superimpose one video stream representing a foreground object such as a television weather person on another video stream representing a background object such as a map. The foreground object is typically photographed against a blue or other fixed color background to facilitate separation of the object from its background based on color or chrominance. Using a C-like pseudocode, this process can be described by

```
for each pixel p[i] {
    read foreground pixel pf[i] from foreground stream;
    read background pixel pb[i] from background stream;
    if (pf[i] is blue) {
        p[i] = pb[i];
        do background processing; }
    else {
        p[i] = pf[i];
        do foreground processing;
    output p[ii] to output stream; }
```

Since subsequent program execution may involve completely different data or completely different operations depending on the outcome of the comparison, execution generally must halt until the result of the conditional operation is known, thereby serializing the program flow and lowering the performance of parallel processing systems.

In the above example, processing will proceed (using parallel operations if supported by the processor) until it encounters the conditional portion of the if-else statement, at which time it must stop and wait for the conditional expression to be evaluated. The time, e.g., in clock cycles, from the time the condition is tested until the first instruction at the chosen branch destination is executed is called the branch latency of the instruction. Contemporary pipelined processors typically have a branch latency of about four cycles.

As noted above, during the branch latency period all functional units of the processor must be idle. Since modern processors often have multiple functional units, the number of wasted processor cycles can be multiplied several times over, and this problem can be compounded by pipelining, another features common to most modem microprocessors. In a pipelined processor having five functional units, for example, twenty instruction issue opportunities are lost to a conditional operation having a four cycle branch latency.

This problem can be ameliorated somewhat by employing a technique called speculation or branch prediction to avoid waiting for the result of a comparison. In this technique the processor guesses an outcome for the branch, i.e., whether it is taken and execution jumps or it is not taken and execution proceeds in sequence, and begins executing instructions corresponding to the chosen outcome. Once the true outcome of the conditional operation is known, the results generated by the speculation are confirmed and execution proceeds if the speculative outcome was the correct one, or the results are flushed from the pipeline if the speculation was incorrect.

For example, in the chroma-keying example shown above, when reaching the conditional expression the processor might speculate that the pixel will indeed be blue (since the area of the background is usually larger than that of the foreground subject, this will more often than not be true) and proceed to execute the corresponding branch.

Speculation works well on branches that almost always go one way, e.g., error checks or checks for exceptional conditions, and branches that occur in repeatable patterns, e.g., the return branch at the end of an iterative loop. It does not yield good results on unbiased, highly data-dependent branches and, given completely random data, will guess correctly only 50% of the time (note, however, that this still represents a 50% usage of otherwise dead branch latency cycles).

Another technique designed to work around branch latency effects is predication (sometimes called a select or a masked vector operation in SIMD and vector processors), in which instructions from both sides of a branch are executed and, when the actual comparison outcome is known, only the results generated by the correct branch are retained. For example, returning to our chroma-keying example, program execution would proceed to execute instructions for background processing and instructions for foreground processing and, if the pixel in question is found to be blue, the results corresponding to foreground processing would be deleted. Predication is necessarily limited to an efficiency of 50% compared to normal execution, since half the instructions executed will always be incorrect. Further, if comparisons are nested so that more than two outcomes are possible, the maximum efficiency of the technique is correspondingly reduces (of course, the efficiency of speculation also decreases with an increase in possible comparison outcomes).

BRIEF SUMMARY OF THE INVENTION

In view of the above problems of the prior art, it is an object of the present invention to provide a data processing system and method which can provide a high level of productive processor cycle usage.

The above objects are achieved according to a first aspect of the present invention by providing a processor implementing conditional vector operations. In a conditional vector operation, an input vector containing multiple operands to be used in conditional operations is divided into two or more output vectors based on a condition vector. Each output vector can then be processed at full processor efficiency without cycles wasted due to branch latency.

For example, in the chroma-keying example given above, conditional vector operations would be used as follows. First, a conditional vector operation is performed to divide the pixel indices i into two index vectors ib and if respectively containing indices of blue pixels from the foreground video stream and non-blue pixels from the foreground video stream as shown below:

For each pixel i, if (pf[i] is blue) append i to ib else append i to if

For each background pixel i in ib p[i]=pb[i]; do background processing on p[i];

For each foreground pixel i in if p[i]=pf[i]; do foreground processing on p[i];

Although the pseudocode example above is coded using a conventional conditional operation, it is in actuality implemented by steering pixel indices to the appropriate index vectors without any speculation or predication. Once the pixels have been segregated into the foreground or background in this way, subsequent chroma-key processing can be performed without conditional operations, processor cycles wasted due to branch latency, incorrect speculation or execution of unnecessary instructions due to predication.

BRIEF DESCRIPTION OF THE DRAWINGS

The above and other objects of the present invention will become readily apparent when reading the following detailed description taken in conjunction with the appended drawings in which:

FIGS. 4A,4B,4C,4D, and 4E show the structure of the instruction set of the graphics processor;

DETAILED DESCRIPTION OF PRESENTLY PREFERRED EMBODIMENTS

First, the overall architecture of an exemplary computer system employing a preferred embodiment of the present invention will be described.

Central to the operation of this preferred embodiment are the concepts of streams and kernels. A stream is a sequence of elements made up of a collection of related data words. A stream may be received by a computation kernel which executes the same operation on all of the elements in the stream to produce another stream that can be output or sent to other kernels for further processing.

Kernels are relatively small computational units that may only access local variables, read input streams and write to output streams. They cannot make arbitrary memory references. In a preferred embodiment of the invention, the computation kernels are expressed in a C-like programming language and compiled into microcode programs that sequence the operation of arithmetic clusters to carry out compound stream operations on each element in a stream. The operations implemented by the kernels are called compound operations because in contrast to conventional vector or stream operations which perform only one operation on each vector element, each kernel performs multiple arithmetic operations on each stream element. A compound stream operation is a small program that has access to the record at the head of each of its input streams and to its local variables. The kernel reads the input streams and writes to the output streams using explicit instructions. The length and record size of each stream can be different and the number of input and output streams need not be the same.

Figure 1:
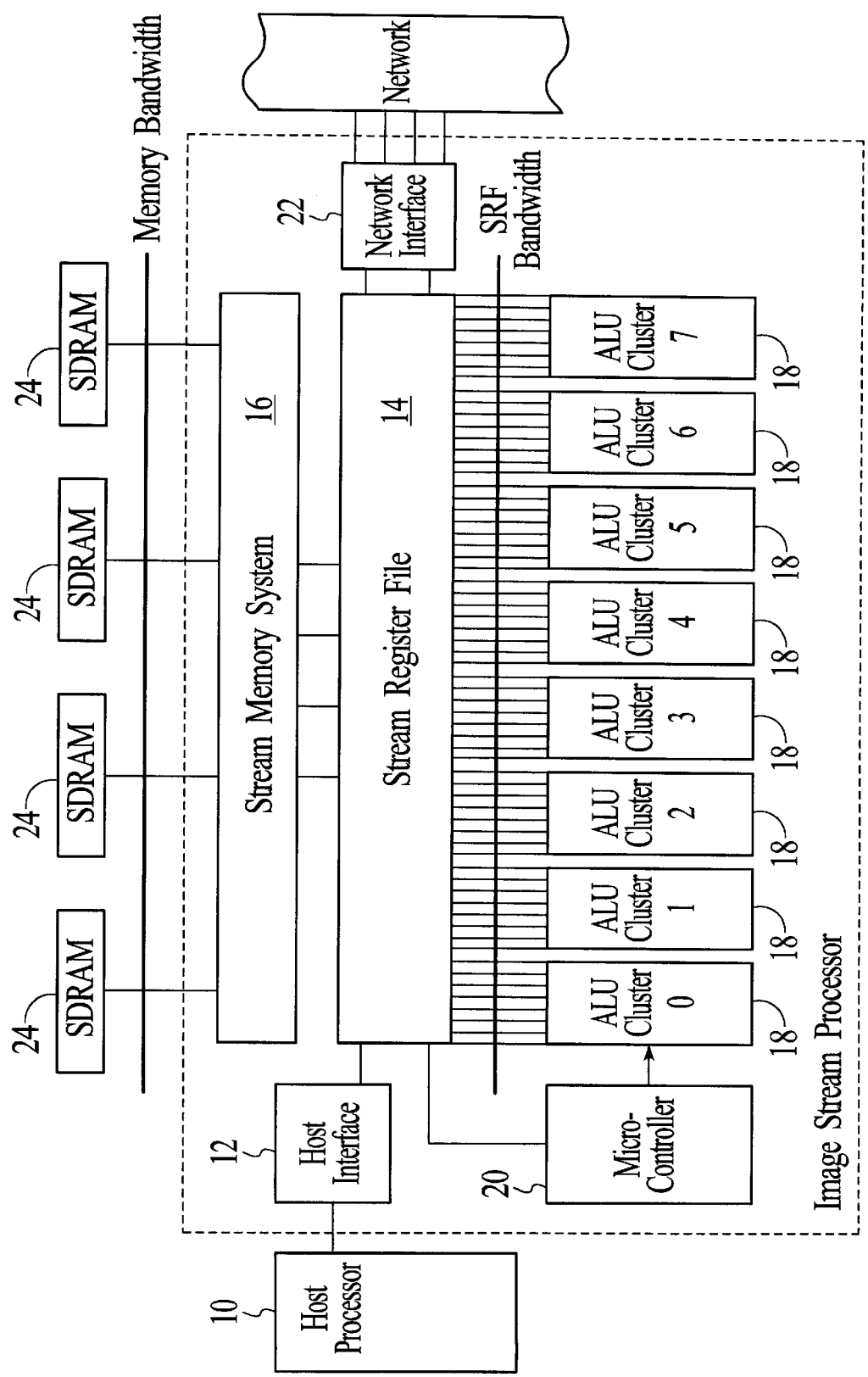
FIG. 1 is a block diagram of a graphics processor according to a preferred embodiment of the invention.

With this foundation in mind, FIG. 1 shows a preferred embodiment of the present invention used in a high speed graphics coprocessor which is described in greater detail in the U.S. patent application Ser. No. 09/152,763 to Dally et al. entitled "System and Method for Performing Compound Vector Operations" filed concurrently herewith, incorporated herein by reference. Here, a host processor 10 provides data to the graphics coprocessor via a host interface 12. The data from the host processor 10 is stored in a stream register file 14 which is the center of activity in the graphics coprocessor. The host interface 12, stream memory 16, arithmetic clusters 18, microcontroller 20 and network interface 22 all interact by transferring streams of data and instructions to and from the stream register file 14.

Figure 2:
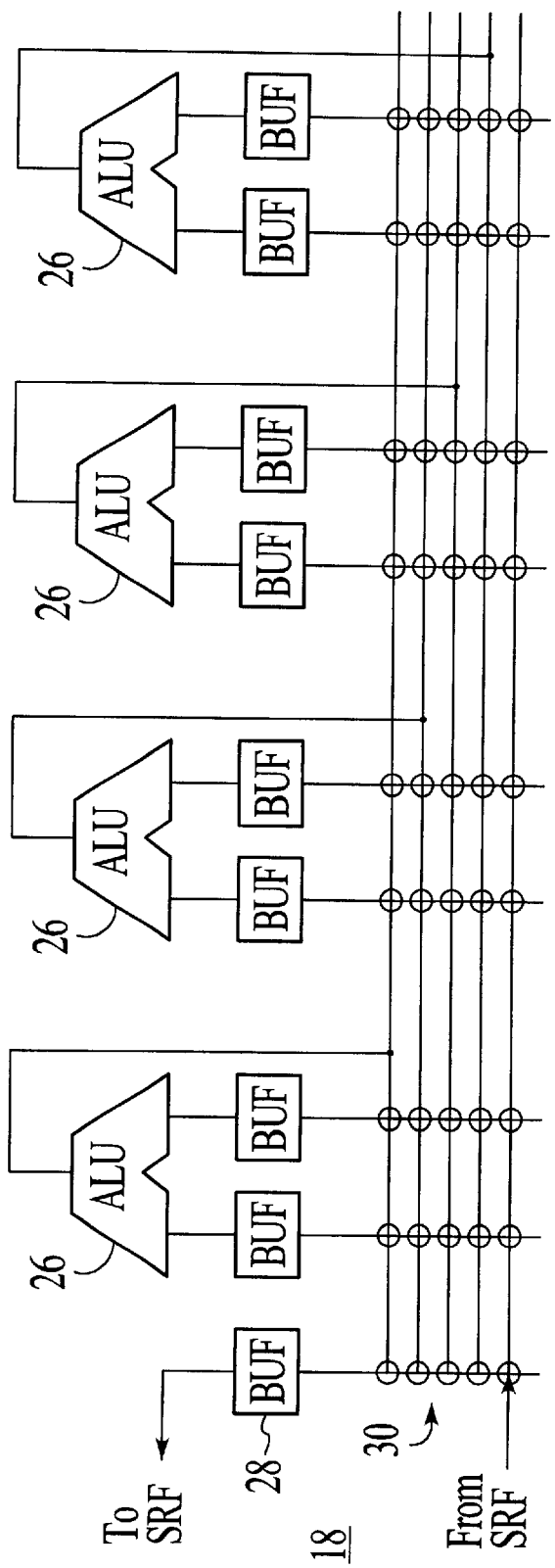
FIG. 2 is a diagram of an arithmetic cluster used in the graphics processor.

The system has a three-level storage hierarchy consisting of the stream memory 16 as a global storage unit, the stream register file 14 as an intermediate storage unit, and local register files 28 (see FIG. 2) in the arithmetic clusters 18 as local storage units. The stream memory 16 holds persistent data; the stream register file 14 stores streams as they are passed to, from and between computation kernels, and the arithmetic clusters 18 use the local register files to store intermediate results produced during computations within the cluster so they do not need to recirculate through the stream register file 14.

The stream register file 14 is preferably a 64 kB memory organized to handle streams of data and instructions (of course, the size of the stream register file may be varied according to the application). An array of eighteen 64-word stream buffers are used to allow read/write access to eighteen streams simultaneously. The internal memory array is thirty-two 32-bit words (i.e., 1024 bits) wide so that it can fill or empty half a stream buffer each cycle. Each stream client may access its dedicated stream buffer every cycle if there is data available to be read or space available to be written. The clients of eight of the stream buffers are the eight clusters 18, and these stream buffers are accessed eight words at a time. The remaining ten stream buffers are accessed a single word at a time.

The stream memory system 16 can perform two simultaneous memory transfers between four thirty-two bit wide SDRAM banks 24 and the stream register file 14 via four stream buffers (two for data and two for indices) in the stream register file 14.

The eight arithmetic clusters 18 connected to the stream register file 14 are controlled by the microcontroller 20. Each cluster 18 operates on one record of a stream so that eight records can be processed simultaneously. An exemplary internal structure of an arithmetic cluster, shown in FIG. 2, includes four functional elements 26 each buffered by one of the local register files 28 which stores kernel constants, parameters and local variables, thereby reducing the bandwidth load on the stream register file 14.

The local register files 28 themselves are fed by a crosspoint switch 30 which distributes outputs of the functional elements 26 to inputs thereof as intermediate data for use in subsequent arithmetic operations. The output of each functional element 26 is connected to one of the input lines of the crosspoint switch 30, and the input of each local register file 28 is fed by a corresponding output line of the crosspoint switch 30. Additionally, four of the crosspoint input lines are fed by the stream register file 16 to provide the contents of the stream dedicated to that cluster, and four of the crosspoint output lines are returned to the stream register file 16 for writing into that stream.

Figure 3:
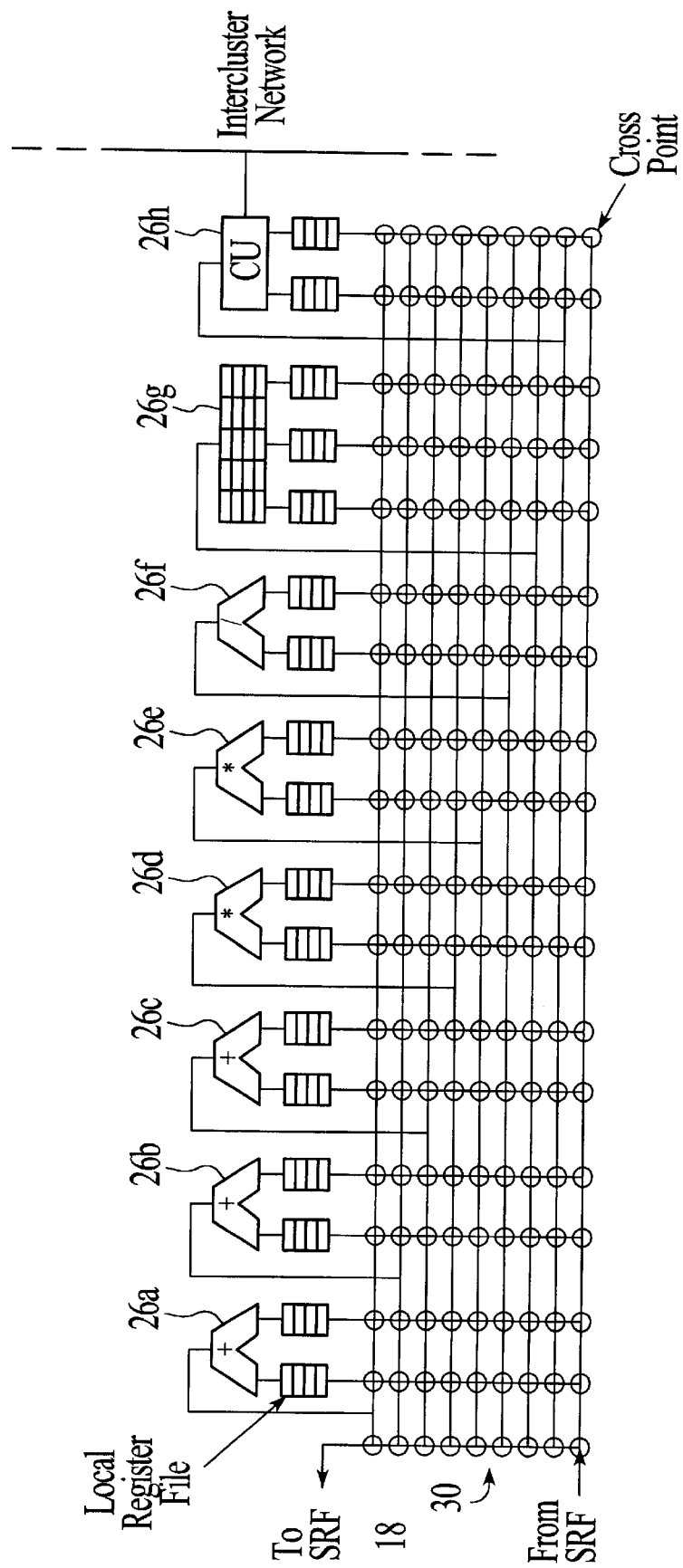
FIG. 3 is a diagram of an arithmetic cluster having variegated functional elements.
Figure 5:
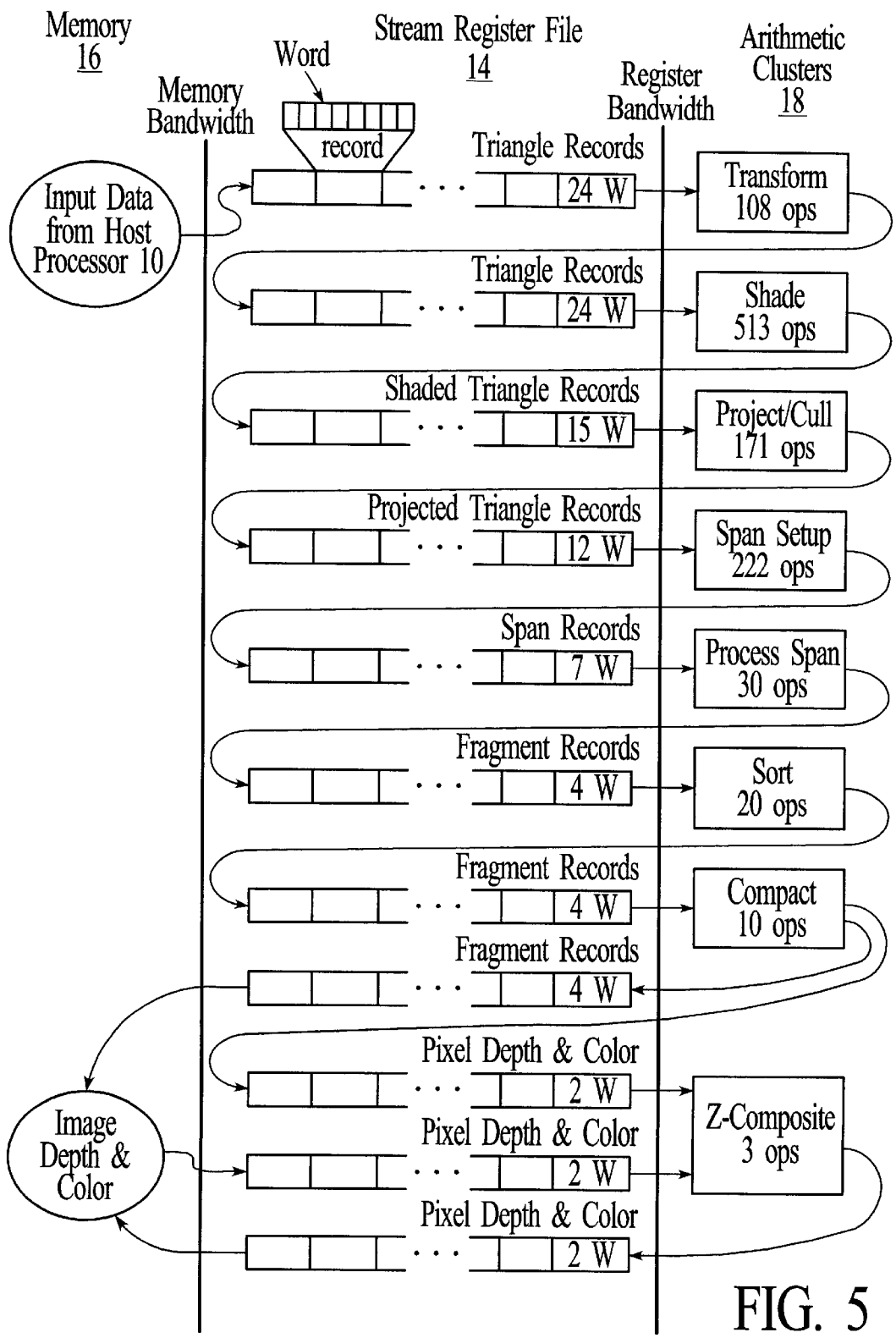
FIG. 5 depicts the flow of data between kernels in the graphics processor when performing a triangle rendering operation.

A specific implementation of the arithmetic cluster 18 structure is shown in FIG. 3 in which three adders 26a–26c, two multipliers 26d and 26e, a divider/square root unit 26f, a 128 entry scratchpad register file 26g, and an inter-cluster communication unit 26h (hereinafter collectively referred to as functional elements 26) are employed as functional elements 26.

The scratch pad register file 26g can be indexed with a base address specified in an instruction word and an offset specified in a local register and may be used for coefficient storage, short arrays, small lookup tables and some local register spilling. The adders 26a–26c and multipliers 26d and 26e have latencies of four and five cycles, respectively, are fully pipelined and perform single precision floating point arithmetic, 32-bit integer arithmetic, and 8-bit or 16-bit parallel subword integer operations. The adders 26a–26c also are able to perform 32-bit integer and parallel subword integer shift operations. The divider/square root unit 26f is not pipelined and operates only on single precision floating point and 32-bit integers.

Finally, the intercluster communication unit 26h performs data transfer among clusters using arbitrary communication patterns. This is particularly useful in applications such as Fast Fourier Transforms where interaction is required between adjacent stream elements.

The microcontroller 20 receives kernels as compiled VLIW microcode programs from the host processor 10. The microcontroller 20 executes each of the kernels as an independent process using the arithmetic clusters 18 for performing computational operations.

The network interface 22 connects the stream register file 14 to four bidirectional links that can be used to connect the graphics processor to other like processors.

Preferably, a substantial portion of the graphics coprocessor, particularly including the stream register file 14, arithmetic clusters 18 and microcontroller 20, are implemented on a single chip using VLSI techniques. This is particularly advantageous because it allows accesses within the arithmetic clusters 18 and accesses to the stream register file 14 to be internalized, thus freeing up more of the pin bandwidth to be used for communication with the stream memories 24. In fact, it appears that a coprocessor as disclosed herein can be implemented on a 1 cm$^2$ 0.25 $\mu$m CMOS chip operating at 400 MHz and perform up to 16 billion operations per second.

The application-level instruction set used by the host processor 10 to program the graphics coprocessor is shown in FIGS. 4A–4E. The set consists of two complementary Load and Store instructions which are used to move streams between the stream register file 14 and the stream memory 16. As shown in FIGS. 4A and 4B, each instruction consists of an instruction descriptor which identifies a starting location, the stream to be loaded into the stream register file 14 or stored in the stream memory 16, and an address descriptor which specifies the record size, base address in memory and addressing mode, e.g., constant stride, indexed or bit-reversed. Optionally, the length of a stream in the stream register file 14 may be included.

FIGS. 4C and 4D show send and receive instructions which allow streams to be passed from the stream register file of one graphics coprocessor to that of another. These instructions are particularly advantageous because they allow multiple processors to operate in cooperation and provide extensibility and scalability. The Send instruction shown in FIG. 4C includes the stream to be sent, a routing header identifying the external coprocessor to which the stream is sent, and a channel indicator designating the communications channel used so that a single node can discriminate between arriving messages. Similarly, the Receive instruction of FIG. 4D includes the stream to be received and a channel indicator designating the communications channel for node discrimination of multiple messages.

Finally, the Operate instruction invokes a kernel to perform its compound stream operation on one or more input streams to generate one or more output streams. The instruction includes a kernel field designating the kernel to be activated, up to four input stream designators which identify streams to be used to provide input data to the kernel's compound stream operation, and up to four output stream designators which identify streams to which results of the compound stream operations are provided.

The host processor 10 issues these application-level instructions to the coprocessor with encoded dependency information which specifies the system resources and data needed to execute the instructions. The host interface 12 buffers these instructions and, when their requirements are satisfied, issues them to the coprocessor. The host interface 12 also maps the coprocessor to the host's address space so that the host can read and write to the stream memory 16 and execute programs that issue the appropriate application-level instructions to the coprocessor.

Figure 6:
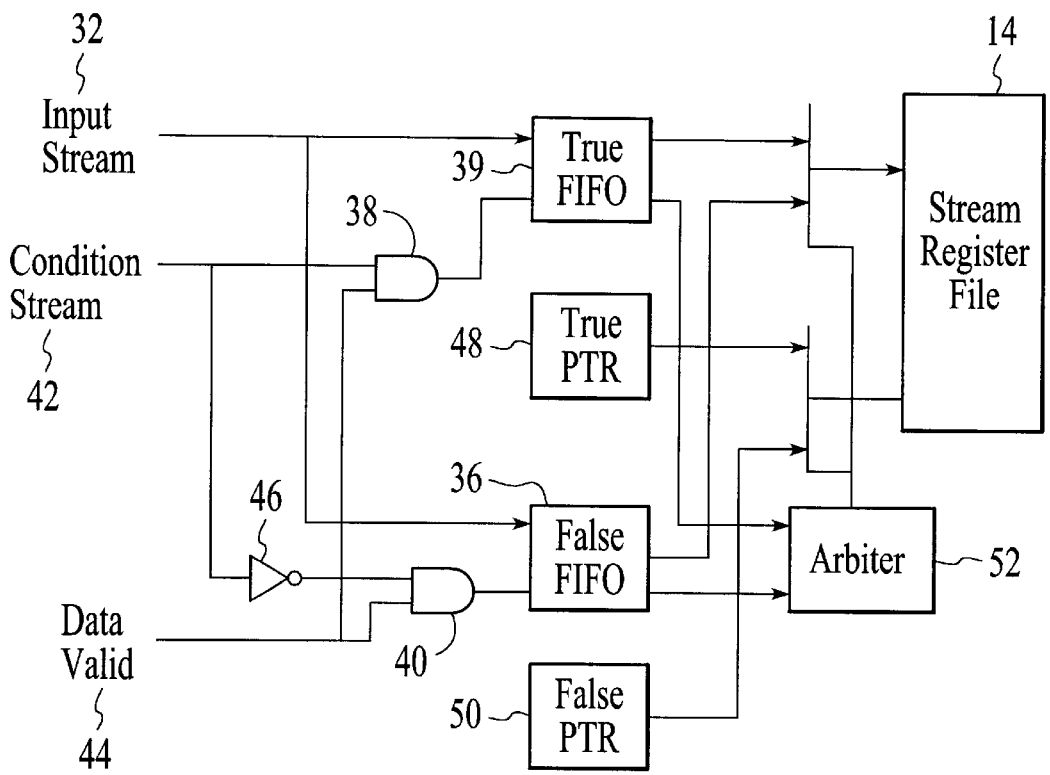
FIG. 6 is a diagram showing how elements are steered into output vectors in a conditional vector operation.

As noted in the summary, another form of latency which occurs in processors is branch latency resulting from the dependency of processing on the evaluation of a conditional operation. Using conditional vector operations, however, branch latency can be reduced. FIG. 6 is a block diagram conceptually showing how a conditional vector output operation is implemented in the present invention. This Figure is a simplified depiction of how a single vector operation would be performed in the preferred embodiment. In actual practice, this operation is complicated by the fact that eight elements are handled at a time. Also, although the conceptual diagram of FIG. 6 shows the generation of both true and false vectors, the preferred embodiment generates only one vector at a time, and two passes are necessary to produce both true and false vectors.

Referring to FIG. 6, an input stream 32 of input data values to be operated upon is simultaneously fed to a True FIFO 34 and a False FIFO 36. The True and False FIFOs 34 and 36 are respectively enabled by AND gates 38 and 40 which are driven by data on a condition stream 42 and a data valid signal 44, and the values in the condition stream are in one-to-one correspondence with the input data values.

The data valid signal 44 indicates when a new valid data item is on the input data line. This line may be asserted in response to, e.g., a conditional output instruction from the microcontroller 20. When the data valid signal 44 is asserted, the True FIFO 34 is enabled to store the data value present on the input stream 32 when the condition stream 42 indicates that the data value satisfies a given condition, and the False FIFO 36 is enabled when the condition stream 42 indicates that the data value does not satisfy the condition (note the inverter 46 in the enable logic for the False FIFO 36). A True PTR register 48 and a False PTR register 50 maintain pointers to the ends of a True vector and a False vector, respectively, in stream register file 14, and these pointers are used to index the True FIFO 34 and False FIFO 36 outputs into the stream register file 14. Presentation of the FIFO outputs and pointers to the stream register file 14 is controlled by an arbiter 52 so that when an eight word-wide section of data values is ready to be appended to the True vector or the False vector within the stream register file 14, the arbiter 52 allows one of the FIFOs to present the data section for storage in the stream register file 14.

This concept may be implemented in the above-described architecture as follows. First, the microcontroller 20 controls the arithmetic clusters 18 to generate or receive a number of input data values, each having a condition value associated therewith (the condition values are typically computed as the result of a comparison operation). Then, a dedicated hardwired circuit performs a parallel prefix scan-+ operation as disclosed in, e.g., Cormen et al., *Introduction to Algorithms (MIT Electrical Engineering and Computer Science Series)*, MIT Press, ISBN 0262031418 (incorporated herein by reference) on the condition bits to generate a partial scratchpad index for all data values so that elements having the same condition value, e.g., true or false, are indexed into the same scratchpad area. The preferred embodiment uses a hardwired circuit to perform the scan-+ operation because the indices must be calculated and the values written into the scratchpad in one cycle, or a bottleneck will occur. Thus, a hardware implementation is used. Each partial index is added to the current running index for the vector corresponding to that condition value and the input data value is stored in the scratchpad register file location pointed to by the absolute index thus obtained via the clusters' inter-cluster communication units 26h. This is done by generating the absolute index so that its least significant three bits denote the destination arithmetic cluster 18 and the remaining bits index into that cluster's scratchpad register file 26g.

Each time a new value is written into a scratchpad register file 26g, the running index is incremented so that subsequently-generated values will be appended to the end of the vector. The incrementing is done modulo-16 using only the least-significant four bits of the running index so that when indexing passes the end of the buffer, it continues at the beginning to effectively implement a 16-word ring buffer. In this way, while one set of eight words is being transferred to the stream register file (as noted above, information exchange between the arithmetic clusters 18 and the stream register file 14 is performed in groups of eight words) while another eight word set is being assembled. Once eight words have been written in one of the scratchpad register files 26g, they can be output to the stream register file 14 for further processing.

In a preferred embodiment of the present invention, only one condition, true or false, is processed in one pass, as mentioned above and as will be described below. Taking the "true" valued processing as an example, FIFO 34 is implemented as two storage locations in each of the scratch pad register files 26g of arithmetic cluster 18, thereby totaling sixteen locations. These storage locations are indexed by a four-bit running index or counter in the microcontroller 20. In a conditional output operation, the parallel prefix scan-+ operation is performed on the condition bits to calculate a relative index for each value corresponding to a "true" condition. These relative indices are added to the four-bit counter in the microcontroller 20 to compute a location for each "true" value. The location for each value consists of three bits denoting which of the eight arithmetic clusters 18 will store the value, and one bit indicating which of the scratch pad locations within that particular cluster 18 will be used.

These values are then used to configure the communication unit of each cluster 18 to index its scratchpad register 26g (along with a base pointer stored in the microcontroller 20) so that each "true" value is written to the appropriate location in the scratchpad register 26g of the appropriate arithmetic cluster 18. The counter in the microcontroller 20 is then incremented by the number of true values thus stored. Each time the counter is incremented by eight, the contents of the corresponding scratchpad locations are written to the stream register file 14.

As an example, suppose the condition bits are 00101100 and the running index is 6. The result of the parallel prefix scan-+ operation is 00011233. Since only the "true" values are used, the result of the scan-+ operation can be regarded as xx0x12xx, where "x" signifies a "don't care" condition. Adding the running index to each of these partial indices yields xx6x78xx. This means that the first "true" value is stored in the first slot in arithmetic cluster number 6, the second "true" value is stored in the first slot of arithmetic cluster number 7 and the third "true" value is stored in the second slot of arithmetic cluster number 8 (the second slot is used because the index 8 is greater than the highest numbered arithmetic cluster (7)).

The values are routed to the appropriate arithmetic clusters 18 by inverting the lower order three bits of the index vector to configure the intercluster communication units 26*h* of each arithmetic cluster 18*g* with a command vector of 5xxxxx24. This denotes that arithmetic cluster number 0 receives a value from cluster number 5; arithmetic cluster 6 receives a value from cluster number 2; and arithmetic cluster number 7 receives a value from cluster number 4, with the remaining clusters being in a "don't care" state. The scratchpad registers 26*g* of each of the three thus-selected clusters (0, 6 and 7) are then indexed by a base pointer plus the slot value. For example, if the base pointer is 32, the scratchpad indices for the eight clusters would be 33xxxxx3232 (note that the second slot in cluster number 0 is being used). Then, since three "true" values have been written, the number of written values totals nine and the first eight are written to the stream register file 14.

Figure 7A:
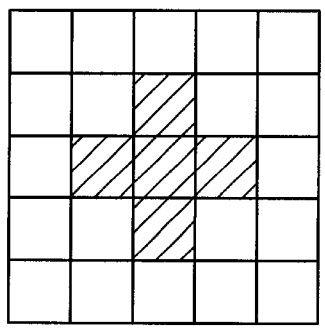
FIGS. 7A and 7B are foreground and background images, respectively, used in an example of conditional vector processing according to the preferred embodiment.
Figure 7B:
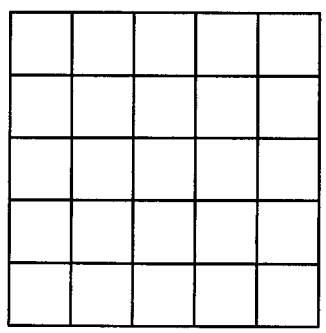

Consider as an example the 5×5 bit foreground and background images shown in FIGS. 7A and 7B, respectively. Assuming that the foreground image of FIG. 7A is to be superimposed on the background image of FIG. 7B using chroma-keying, the pixels are sequentially indexed right-to-left beginning with the upper left-hand corner and a blue foreground color (which is not to be included in the superimposed image) is represented by "7", the clusters would generate the following input data values and associated condition values for each pixel index:

| 0 | 1 | 2 | 3 | 4 |
|---|---|---|---|---|
| F | F | F | F | F |
| 5 | 6 | 7 | 8 | 9 |
| F | F | F | F | F |
| 10 | 11 | 12 | 13 | 14 |
| F | T | T | T | F |
| 15 | 16 | 17 | 18 | 19 |
| F | F | T | F | F |
| 20 | 21 | 22 | 23 | 24 |
| F | F | F | F | F |

Processing the pixel data for the foreground and background images so that a pixel index is written to the true vector when the corresponding condition value is true and to the false vector when the corresponding condition value is false results in a true vector of

<7 11 12 13 17 > and a false vector of

<0 1 2 3 4 5 6 8 9 10 14 15 16 18 19 20 21 22 23 24 > which are stored in respective ones of the arithmetic cluster scratchpad registers 26*g*. Since the true vector has only five elements, it will not be output to the stream register file 14 until additional values are written into the scratchpad register 26*g* holding the true file to reach a total of eight words (assuming the scratchpad register 26*g* was previously empty). However, since the false vector is twenty elements long, eight elements will be written to the stream register file 14, followed by eight more elements to leave a final set of four elements in the false vector scratchpad register. Once the true and false vectors are written to the stream register file 14, foreground and background processing may be performed on the pixels referenced by the vector index elements as is known in the art. If the length of the final vector is not a multiple of eight, all eight words in the scratchpad buffer are written back to the stream register file 14 and the actual count is provided to update the output stream length. The length of the result stream is stored in a register file associated with the stream register file 14.

In the complementary conditional vector input operation, each arithmetic cluster 18 generates a conditional value indicative of whether data should be written to it (e.g., "1" for yes, "0" for no). Then, a conditional vector input instruction is executed by the microcontroller 20 to distribute a word from the input stream to each arithmetic cluster 18 which generated a "true" condition. This is done by keeping the next eight to sixteen elements of the input stream in the scratchpad registers 26*g* of the arithmetic clusters 18. As with the conditional vector output operation, the microcontroller 20 maintains a base pointer and a four-bit running index. A parallel prefix scan-+ operation is performed on the condition values to compute the communication command and scratchpad indices similar to the technique used above; however, in the conditional vector input operation, data is distributed rather than concentrated and the scratchpad registers 26*g* are read rather than written.

For example, suppose the base pointer is 6, the running index is 6, and the condition values generated by the arithmetic clusters 18 are 10100010. The parallel prefix operation yields 01122223, or representing "false"-valued conditions by a don't care state, 0x1xxx2x. Adding the running index to this yields 6x7xxxx8x, thereby providing a communication command vector 6x7xxx0x to be applied to the intercluster communication units 26*h* and a scratchpad index vector of 17 x x x x x 16 16. Thus, cluster number 0 reads the first slot of cluster number 6; cluster number 2 reads the first slot of cluster number 7; and cluster number 6 reads the second slot of cluster number 0 (note the index 17 for cluster number 0 in the scratchpad index vector). This causes the pointer to roll over, and eight more values are read from the stream register file 14 into location 16 in each scratchpad register file 26*g*.

Thus, a processor according to the present invention implements conditional vector operations in which an input vector containing multiple operands to be used in conditional operations is divided into two or more output vectors based on a condition vector. Each output vector can then be processed at full processor efficiency without cycles wasted due to branch latency. Data to be processed is divided into two groups based on whether or not they satisfy a given condition by, e.g., steering each to one of two index vectors. Once the data has been segregated in this way, subsequent processing can be performed without conditional operations, processor cycles wasted due to branch latency, incorrect speculation or execution of unnecessary instructions due to predication.

As will be readily apparent to those skilled in the art, modifications and variations of the preferred embodiment will be readily apparent to those skilled in the art. For example, although a preferred embodiment of the present invention has been disclosed in connection with chroma keying, many other applications are of course possible. Further, although the embodiment uses a two-valued, i.e., Boolean, condition, many-valued conditional operations may be implemented in which, e.g., the condition has four possible outcomes, with four separate vectors being generated in a conditional vector output operation and four vectors consumed in a conditional vector input operation.

Also, although the preferred embodiment performs only one conditional vector operation in one pass, e.g., true or false, the invention may be used to implement a system which computes both true and false conditions in one pass. This would entail computing separate scratchpad indices for the true and false conditions. Consequently, a dual-port scratchpad must be used since both true and false values could be written to the same scratchpad register at different locations. Such variations are within the scope of the present invention as defined by the appended claims.

What is claimed is:

1. A method of performing a conditional vector output operation in a processor, the method comprising:

receiving electrical signals representative of an input data vector;

generating electrical signals representative of a condition vector, the number of values in the input data vector being equal to the number of values in the condition vector, values in the input data vector and in the condition vector being in one-to-one correspondence with one another, and each value in the condition vector being a result of evaluating a predetermined conditional expression using data corresponding to a value in the input data vector; and generating electrical signals representative of an output vector containing values in the input data vector for which corresponding values in the condition vector are equal to a predetermined value;

wherein generating the output vector includes
maintaining a running index indicative of a last-added value in the output vector;
for each value, in a group of values from the input data vector, corresponding to a condition value in the condition vector which is equal to the predetermined value, calculating an absolute index indicative of a position of the value in the group within an output vector, the absolute index corresponding to the condition value and the running index; and
including each of the values within the group in an output vector corresponding to condition vector values equaling the predetermined value, at respective positions denoted by the absolute indices.

2. The method of claim 1 wherein further comprising:
calculating a partial index using a parallel prefix scan-+ operation; and
adding the partial index to the running index, the running index corresponding to the condition value.

3. The method of claim 1 further comprising, after including the values within the group in the output vector, incrementing the running index by an amount corresponding to the number of values added to the output vector.

4. The method of claim 3 wherein the running index is incremented using a modular arithmetic operation.

5. The method of claim 4, wherein the modulus of the modular arithmetic operation is double the number of values added to the output vector.

6. The method of claim 1, wherein the running index and the absolute indices point to locations in at least one programmable memory.

7. The method of claim 6, wherein the absolute indices each include a first portion indicating one of a plurality of programmable memories and a second portion indicating an absolute location within that memory.

8. A method of performing a conditional vector output operation in a processor, the method comprising:

receiving electrical signals representative of an input data vector;

generating electrical signals representative of a condition vector, the number of values in the input data vector being equal to the number of values in the condition vector, values in the input data vector and in the condition vector being in one-to-one correspondence with one another, and each value in the condition vector being a result of evaluating a predetermined conditional expression using data corresponding to a value in the input data vector; and generating electrical signals representative of an output vector containing values in the input data vector for which corresponding values in the condition vector are equal to a predetermined value;

wherein generating electrical signals representative of the output vector includes:
storing values from the input data vector corresponding to values in the condition vector which are equal to one another in an intermediate memory; and
when the number of values thus stored equals a predetermined number, adding the values to the output vector.

* * * * *

UNITED STATES PATENT AND TRADEMARK OFFICE
CERTIFICATE OF CORRECTION

PATENT NO. : 6,269,435 B1
APPLICATION NO. : 09/152944
DATED : July 31, 2001
INVENTOR(S) : Dally et al.

It is certified that error appears in the above-identified patent and that said Letters Patent is hereby corrected as shown below:

Col. 1, line 10: "conjuction" should read --conjunction--.

Col. 2, line 32: "do foreground processing;" should read --do foreground processing; }--

Col. 3, line 34: "is correspondingly" should read --correspondingly--.

Col. 9, line 43-52, the table should read:

| --0 | 1  | 2  | 3  | 4   |
|-----|----|----|----|-----|
| F   | F  | F  | F  | F   |
| 5   | 6  | 7  | 8  | 9   |
| F   | F  | T  | F  | F   |
| 10  | 11 | 12 | 13 | 14  |
| F   | T  | T  | T  | F   |
| 15  | 16 | 17 | 18 | 19  |
| F   | F  | T  | F  | F   |
| 20  | 21 | 22 | 23 | 24  |
| F   | F  | F  | F  | F-- |

Col 10, line 10: "6," should read --16,--

Signed and Sealed this

Second Day of January, 2007

JON W. DUDAS
*Director of the United States Patent and Trademark Office*